United States Patent
Mahood et al.

(10) Patent No.: US 10,844,217 B2
(45) Date of Patent: Nov. 24, 2020

(54) CAPACITOR FILMS WITH HIGH TEMPERATURE PERFORMANCE, METHODS OF MANUFACTURE, AND ARTICLES THEREOF

(71) Applicant: SABIC GLOBAL TECHNOLOGIES B.V., Bergen op Zoom (NL)

(72) Inventors: James Alan Mahood, Evansville, IN (US); Fatime N. Milandou, West Chester, PA (US); Matthew Frank Niemeyer, Morth Chatham, NY (US); Neal Pfeiffenberger, Conshohocken, PA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 151 days.

(21) Appl. No.: 16/099,939

(22) PCT Filed: May 10, 2017

(86) PCT No.: PCT/US2017/031877
§ 371 (c)(1),
(2) Date: Nov. 8, 2018

(87) PCT Pub. No.: WO2017/196922
PCT Pub. Date: Nov. 16, 2017

(65) Prior Publication Data
US 2019/0153217 A1    May 23, 2019

Related U.S. Application Data

(60) Provisional application No. 62/335,358, filed on May 12, 2016.

(51) Int. Cl.
| | | |
|---|---|---|
| *C08L 69/00* | (2006.01) | |
| *C08J 5/18* | (2006.01) | |
| *H01G 4/32* | (2006.01) | |
| *H01G 4/18* | (2006.01) | |
| *H01G 4/008* | (2006.01) | |

(52) U.S. Cl.
CPC ............... *C08L 69/00* (2013.01); *C08J 5/18* (2013.01); *H01G 4/008* (2013.01); *H01G 4/18* (2013.01); *H01G 4/32* (2013.01); *C08J 2369/00* (2013.01); *C08J 2423/04* (2013.01); *C08J 2423/20* (2013.01); *C08J 2445/00* (2013.01); *C08L 2203/20* (2013.01)

(58) Field of Classification Search
USPC ......................................... 525/147; 428/412
See application file for complete search history.

(56) References Cited

U.S. PATENT DOCUMENTS

| | | |
|---|---|---|
| 3,932,250 A | 1/1976 | Sato et al. |
| 4,604,303 A | 8/1986 | Takakura et al. |
| 4,786,708 A | 11/1988 | Serini et al. |
| 5,087,677 A | 2/1992 | Brekner et al. |
| 5,416,148 A * | 5/1995 | Farah .................. C08L 69/00 524/409 |
| 5,552,504 A | 9/1996 | Bennett et al. |
| 5,869,586 A | 2/1999 | Riedel et al. |
| 6,068,936 A | 5/2000 | Peiffer et al. |
| 6,316,560 B1 | 11/2001 | Jacobs et al. |
| 6,426,861 B1 | 7/2002 | Munshi |
| 6,559,270 B1 | 5/2003 | Siclovan et al. |
| 6,630,234 B1 | 10/2003 | Tanisho et al. |
| 6,919,422 B2 | 7/2005 | Gallucci et al. |
| 7,079,372 B2 | 7/2006 | Weber et al. |
| 7,365,124 B2 | 4/2008 | Srinivasan et al. |
| 7,648,758 B2 | 1/2010 | Morin |
| 7,736,723 B2 | 6/2010 | Wilkie |
| 8,218,291 B2 | 7/2012 | Silvi et al. |
| 8,779,040 B2 | 7/2014 | Van Der Weele et al. |
| 9,051,463 B2 | 6/2015 | Uno et al. |
| 9,328,240 B2 | 5/2016 | Van Der Mee et al. |
| 9,567,445 B2 | 2/2017 | Mahood et al. |
| 9,659,711 B2 | 5/2017 | Odle et al. |
| 2003/0171494 A1 | 9/2003 | Aramaki et al. |
| 2006/0069236 A1 | 3/2006 | Brunelle et al. |

(Continued)

FOREIGN PATENT DOCUMENTS

| | | |
|---|---|---|
| EP | 0485893 A1 | 5/1992 |
| EP | 0520416 A | 12/1992 |
| JP | 03203945 A | 9/1991 |
| JP | 2015216312 A | 12/2015 |
| WO | 2014030133 A1 | 2/2014 |
| WO | 2015013541 A1 | 1/2015 |

OTHER PUBLICATIONS

Machine translation of Detailed Description of JP 03-203945 retrieved from Espacenet; publication date: May 1991. (Year: 1991).*
International Search Report for International Application No. PCT/US2017/031877, International Filing Date May 10, 2017, dated Aug. 10, 2017, 6 pages.
SciFinder; American Chemical Society; 2016; 12 pages.
Written Opinion International Application No. PCT/US2017/031877, International Filing Date May 10, 2017, dated Aug. 10, 2017, 6 pages.

*Primary Examiner* — Fred M Teskin

(74) *Attorney, Agent, or Firm* — Cantor Colburn LLP

(57) ABSTRACT

A film including 70 to 99 weight percent of an amorphous, high heat copolycarbonate having a glass transition temperature of at least 170° C., preferably 170 to 230° C., more preferably 175 to 200° C., and 1 to 30 weight percent of a cyclic olefin copolymer each based on the total weight of polymers in the film; wherein the film has a dielectric breakdown strength of greater than 700 Volts/micrometer, preferably 700 to 1250 Volts/micrometer at 150° C., is provided. Methods for the manufacture of the film and articles including the films are provided.

20 Claims, No Drawings

(56) References Cited

U.S. PATENT DOCUMENTS

| | | |
|---|---|---|
| 2007/0123688 A1* | 5/2007 | Mahood ................ C08G 64/28 |
| | | 528/196 |
| 2008/0004404 A1 | 1/2008 | Van De Grampel et al. |
| 2008/0119631 A1 | 5/2008 | Mullen |
| 2009/0088504 A1 | 4/2009 | Chatterjee et al. |
| 2009/0318604 A1 | 12/2009 | De Kraker et al. |
| 2010/0172066 A1 | 7/2010 | Baer et al. |
| 2011/0071261 A1 | 3/2011 | Hoeks et al. |
| 2011/0216474 A1 | 9/2011 | Grosrenaud et al. |
| 2011/0242729 A1 | 10/2011 | Silvi et al. |
| 2012/0287556 A1 | 11/2012 | Silvi et al. |
| 2013/0118581 A1 | 5/2013 | Zhou et al. |
| 2013/0331492 A1 | 12/2013 | Sharma |
| 2014/0295363 A1 | 10/2014 | Sun et al. |
| 2016/0060403 A1 | 3/2016 | Mahood et al. |
| 2016/0084490 A1 | 3/2016 | Davis et al. |

* cited by examiner

CAPACITOR FILMS WITH HIGH TEMPERATURE PERFORMANCE, METHODS OF MANUFACTURE, AND ARTICLES THEREOF

CROSS REFERENCE TO RELATED APPLICATIONS

This application is a National Stage application of PCT/US2017/031877, filed May 10, 2017, which claims the benefit of U.S. Provisional Application No. 62/335,358, filed on May 12, 2016, both of which are incorporated by reference in their entirety herein.

BACKGROUND

This disclosure relates to polymer films, and in particular to polymer films useful for the manufacture of capacitors.

Electrostatic film capacitors with high volumetric energy density, high operating temperature, and long lifetime are critical components for pulse-power, automotive, and industrial electronics. Capacitors are essentially energy-storing devices having two parallel conductive plates separated by a thin layer of an insulating (dielectric) film. When a voltage is applied across the plates, the electric field in the dielectric displaces electric charges, and thus stores energy. The amount of energy stored by a capacitor depends on the dielectric constant and breakdown voltage of the insulating material, and the dimensions (total area and thickness) of the film, such that in order to maximize the total amount of energy that a capacitor can accumulate, the dielectric constant and breakdown voltage of the film are maximized, and the thickness of the film minimized. Because the physical characteristics of the dielectric material in the capacitor are the primary determining factors for the performance of a capacitor, improvements in one or more of the physical properties of the dielectric material in a capacitor can result in corresponding performance improvements in the capacitor component, usually resulting in performance and lifetime enhancements of the electronics system or product in which it is embedded.

Capacitors designed for high temperature applications can be constructed from thin films of high temperature polymers. Most high temperature polymers have undesirable dielectric breakdown strength at room temperature, and the dielectric breakdown strength typically decreases as the polymers are heated.

There accordingly remains a need for films and methods for their manufacture that can produce films having excellent electrical properties, in particular high dielectric breakdown strength for use in high temperature applications.

BRIEF DESCRIPTION

A film, comprising 70 to 99 weight percent, preferably 75 to 95 weight percent, of an amorphous, high heat copolycarbonate having a glass transition temperature of at least 170° C., preferably 170 to 230° C., more preferably 175 to 200° C., and 1 to 30 weight percent, preferably 5 to 25 weight percent of a cyclic olefin copolymer, each based on the total weight of polymers in the film; wherein the film has a dielectric breakdown strength of greater than 700 Volts/micrometer, preferably 700 to 1250 Volts/micrometer at 150° C., is provided.

A method of producing a film comprising extruding a film-forming composition comprising the copolycarbonate comprising first repeating bisphenol carbonate units and second repeating carbonate units that are not the same as the first repeating units; and the cyclic olefin copolymer is provided.

Articles comprising a film produced by the provided methods are also provided.

The above described and other features are exemplified by the following detailed description.

DETAILED DESCRIPTION

The present disclosure is generally directed to films which are suitable for use in high temperature applications. The films comprise an amorphous, high heat copolycarbonate having at glass transition temperature of at least 170° C., and a cyclic olefin copolymer, wherein the film has a dielectric breakdown strength of greater than 700 Volts/micrometer (V/um) at 150° C. In an additionally advantageous feature, the film can have a dielectric breakdown strength of 780 to 1000 V/um at room temperature. In particular, the films provide an increase in the dielectric breakdown strength compared to films not containing a cyclic olefin copolymer, while retaining other advantageous physical and electrical characteristics, such as dielectric constant and dissipation factor.

The amorphous, high heat copolycarbonates used in the films can have first and second carbonate units, wherein the first carbonate units are of formula (1)

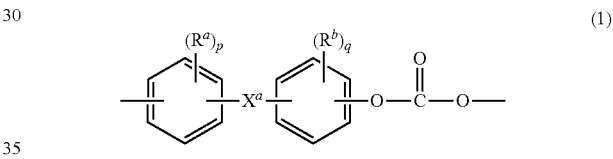

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-5}$ alkyl, or a group of the formula —C(=$R^e$)— wherein $R^e$ is a divalent $C_{1-6}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (preferably para) to each other on the $C_6$ arylene group.

In a specific embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-5}$ alkyl, or a group of the formula —C(=$R^e$)— wherein $R^e$ is a divalent $C_{1-6}$ hydrocarbon group. In another specific embodiment, $R^a$ and $R^b$ are each independently a methyl group, p and q are each independently 0 to 1, and $X^a$ is a single bond, a $C_{1-11}$ alkylidene of formula —C($R^c$)($R^d$)— wherein $R^c$ and $R^d$ are each independently hydrogen or $C_{1-5}$ alkyl. In an embodiment, p and q is each 1, and $R^a$ and $R^b$ are each a $C_{1-3}$ alkyl group, preferably methyl, disposed meta to the oxygen on each ring. The bisphenol carbonate units (1) can be derived from bisphenol A, where p and q are both 0 and $X^a$ is isopropylidene.

The first carbonate units (1) can be produced from the corresponding dihydroxy (bisphenol) compounds. Some illustrative examples of specific bisphenol compounds that can be used to produce first carbonate units (1) include 4,4'-dihydroxybiphenyl, bis(4-hydroxyphenyl)methane, 1,2-bis(4-hydroxyphenyl)ethane, 2-(4-hydroxyphenyl)-2-(3-hydroxyphenyl)propane, 2,2-bis(3-methyl-4-hydroxyphenyl) propane, 2,2-bis(3-ethyl-4-hydroxyphenyl)propane, 2,2-bis (3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, bis (4-hydroxyphenyl)ether, bis(4-hydroxyphenyl)sulfide, bis (4-hydroxyphenyl)sulfoxide, and bis(4-hydroxyphenyl) sulfone. A combination comprising at least one of the foregoing bisphenol compounds can be used.

Specific examples of bisphenol compounds that can be used in the production of first carbonate units (1) include 1,1-bis(4-hydroxyphenyl) methane, 1,1-bis(4-hydroxyphenyl) ethane, 2,2-bis(4-hydroxyphenyl) propane ("bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, and combinations comprising at least one of the foregoing bisphenol compounds.

The copolycarbonate further comprises second carbonate units that are not the same as the first carbonate units (1). The second carbonate units are of formula (4)

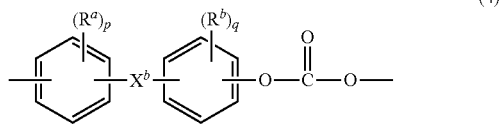

(4)

wherein $R^a$ and $R^b$ are each independently $C_{1-12}$ alkenyl, $C_{3-8}$ cycloalkyl, or $C_{1-12}$ alkoxy, p and q are each independently integers of 0 to 4, and $X^b$ is a $C_{3-8}$ cycloalkylene, a fused $C_{6-18}$ cycloalkylene, a group of the formula $-J^1-G-J^2-$ wherein $J^1$ and $J^2$ are the same or different $C_{1-6}$ alkylene group and G is a $C_{3-12}$ cycloalkylene, a $C_{3-12}$ cycloalkylidene, or a $C_{6-16}$ arylene, a $C_{12-25}$ alkylidene of formula $—C(R^c)(R^d)—$ wherein $R^c$ and $R^d$ are each independently hydrogen, $C_{1-24}$ alkyl, $C_{4-12}$ cycloalkyl, $C_{6-12}$ aryl, $C_{7-12}$ arylalkylene, $C_{7-12}$ heteroarylalkylene, $C_{7-12}$ alkylarylene, $C_{1-12}$ heteroalkyl, $C_{3-12}$ heterocycloalkyl, or $C_{7-12}$ heteroaryl, a group of the formula $—C(=R^e)—$ wherein $R^e$ is a divalent $C_{7-31}$ hydrocarbon group, a $C_{3-18}$ cycloalkylidene, a fused $C_{7-18}$ cycloalkylidene, or a fused $C_{6-18}$ heterocycloalkylidene.

For example, $X^b$ can be a fused $C_{7-18}$ cycloalkylidene or heterocycloalkylidene of formula (4a)

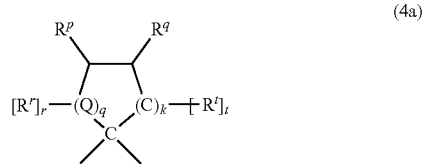

(4a)

wherein $R^r$, $R^p$, $R^q$, and $R^t$ are each independently hydrogen, oxygen, or $C_{1-12}$ organic groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl or $C_{1-12}$ acyl; r is 0 to 2, t is 1 or 2, q is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (3) will have an unsaturated carbon-carbon linkage where the ring is fused. When k is one and i is 0, the ring as shown in formula (6) contains 4 carbon atoms, when k is 2, the ring contains 5 carbon atoms, and when k is 3, and the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Specific second bisphenol carbonate units of this type are phthalimidine carbonate units of formula (4b)

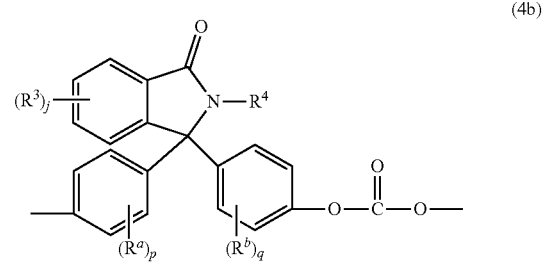

(4b)

wherein $R^a$, $R^b$, p, and q are as in formula (4), $R^3$ is each independently a $C_{1-6}$ alkyl, j is 0 to 4, and $R^4$ is hydrogen, $C_{1-6}$ alkyl, phenyl optionally substituted with 1 to 5 $C_{1-6}$ alkyl groups. In an embodiment, $R^a$ and $R^b$ are each independently $C_{1-3}$ alkyl. For example, the phthalimidine carbonate units are of formula (4c)

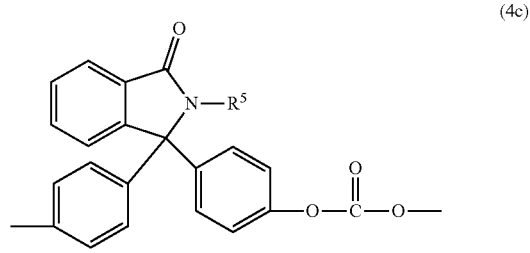

(4c)

wherein $R^5$ is hydrogen, phenyl optionally substituted with up to five $C_{1-6}$ alkyl groups, or $C_{1-4}$ alkyl. In an embodiment, $R^5$ is hydrogen, phenyl, or methyl. Carbonate units (4c) wherein $R^5$ is phenyl can be derived from 2-phenyl-3,3-bis (4-hydroxyphenyl)phthalimidine (also known as N-phenyl phenolphthalein bisphenol, or "PPPBP," or 3,3-bis(4-hydroxyphenyl)-2-phenylisoindolin-1-one).

Other bisphenol carbonate repeating units of this type are the isatin carbonate units of formula (4d) and (4e)

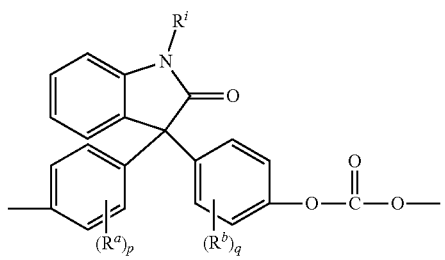
(4d)

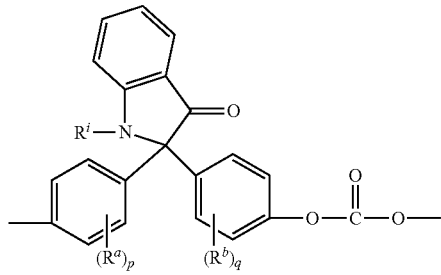
(4e)

wherein $R^a$ and $R^b$ are each independently $C_{1-12}$ alkyl, p and q are each independently 0 to 4, and $R^i$ is $C_{1-12}$ alkyl, phenyl optionally substituted with 1 to 4 $C_{1-10}$ alkyl groups, or benzyl optionally substituted with 1 to 5 $C_{1-10}$ alkyl groups. In an embodiment, $R^a$ and $R^b$ are each methyl, p and q are each independently 0 or 1, and $R^i$ is $C_{1-4}$ alkyl or phenyl.

Examples of bisphenol carbonate units (4) wherein $X^b$ is a $C_{3-18}$ cycloalkylidene include the cyclohexylidene-bridged bisphenol of formula (4f)

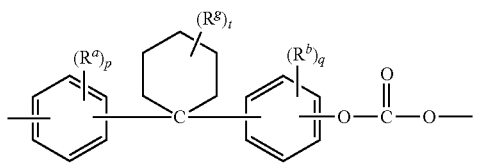
(4f)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, preferably 0. In still another embodiment, p and q are each 0, each $R^g$ is methyl, and t is 3, such that $X^b$ is 3,3,5-trimethylcyclohexylidene (TMC).

Examples of other bisphenol carbonate units (4) wherein $X^b$ is a $C_{3-18}$ cycloalkylidene include adamantyl units of formula (4g) and fluorenyl units of formula (4h)

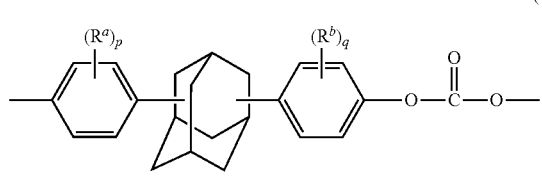
(4g)

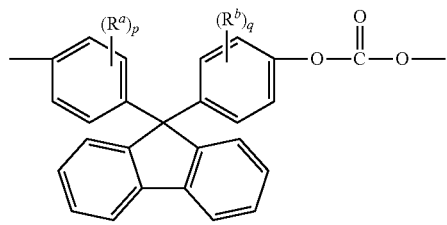
(4h)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1; preferably, $R^a$, $R^b$ are each methyl, p and q are each 0 or 1, and when p and q are 1, the methyl group is disposed meta to the cycloalkylidene bridging group. Carbonates containing units (4a) to (4g) are useful for making polycarbonates with high glass transition temperatures (Tg) and high heat distortion temperatures.

Exemplary $X^b$ groups include 2-phenyl-phthalimidine, phthalimidine, cyclohexylmethylidene, 2-[2.2.1]-bicycloheptylidene, cyclohexylidene, 3,3,5-trimethylcyclohexylidene, cyclopentylidene, cyclododecylidene, and adamantylidene.

Bisphenol carbonate units (4) are generally produced from the corresponding bisphenol compounds. Specific examples of bisphenol compounds of formula (5) include bis(4-hydroxyphenyl)diphenylmethane, 1,1-bis(4-hydroxy-t-butylphenyl) propane, 1,6-dihydroxynaphthalene, 2,6-dihydroxynaphthalene, 6,6'-dihydroxy-3,3,3',3'-tetramethyl-spiro(bis)indane ("spirobiindane bisphenol"), 2,6-dihydroxydibenzo-p-dioxin, 2,6-dihydroxythianthrene, 2,7-dihydroxyphenoxathiin, 2,7-dihydroxy-9,10-dimethylphenazine, 3,6-dihydroxydibenzofuran, 3,6-dihydroxydibenzothiophene, 2,7-dihydroxycarbazole, 2,6-dihydroxythianthrene 1,1-bis(4-hydroxyphenyl) cyclododecylidene, 1,1-bis(4-hydroxyphenyl) adamantylidene, 3,3-bis(4-hydroxyphenyl) phthalimidine, 2-phenyl-3,3-bis(4-hydroxyphenyl) phthalimidine (PPP-BP), 1,1-bis(4-hydroxy-3-methylphenyl)cyclohexane, and 1,1-bis(4-hydroxyphenyl)-3,3,5-trimethylcyclohexane, which can be derived from isophorone. Combinations comprising at least one of the foregoing dihydroxy compounds can also be used.

The relative mole ratio of the first carbonate units (1) and second carbonate units (4) can vary from 99:1 to 1:99, depending on the desired characteristics of the copolycarbonate, including glass transition temperature (Tg), impact strength, ductility, flow, and like considerations. For example, the mole ratio of first carbonate units (1):second carbonate units (4) can be from 90:10 to 10:90, from 80:20 to 20:80, from 70:30 to 30:70, or from 60:40 to 40:60. In a specific embodiment, the copolycarbonate comprises 60 to 80 mole % first carbonate units (1) and 20 to 40 mole % second carbonate units (4), where the second carbonate units comprise a fused $C_{6-18}$ heterocycloalkylidene. In a specific embodiment, the copolycarbonate is PPPBP-BPA, the mole ratio of first carbonate units (1) to second carbonate units (4) can be from 99:1 to 50:50, or from 80:20 to 45:55. In a specific embodiment, the copolycarbonate comprises 35 to 55 mole % first carbonate units (1) and 45 to 65 mole % second carbonate units (4), where the second carbonate units comprise a $C_{3-18}$ cycloalkylidene.

Other carbonate units can be present in any of the copolycarbonates described herein in relatively small amounts, for example less than 30 mole %, less than 20 mole %, or less than 15 mole %, based on the total moles of units in the copolycarbonate. In still another embodiment, no other types of repeating units are present in the copolycarbonates. In an embodiment, no other carbonate units are present.

The other carbonate units can be derived from aliphatic or aromatic dihydroxy compounds having 1 to 32 carbon atoms, for example 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, and 2,6-dihydroxythianthrene. A specific aromatic dihydroxy compound includes the monoaryl dihydroxy compounds of formula (6)

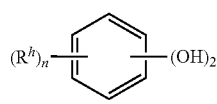

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine. In an embodiment, no halogens are present. Specific monoaryl dihydroxy compounds (6) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like; catechol; hydroquinone; and substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone. A combination comprising at least one of the foregoing aromatic dihydroxy compounds can be used. In an embodiment, the copolycarbonate comprises carbonate units of formulas (1) and (4), and less than 10 mole % of units derived from monoaryl dihydroxy compounds (6), i.e., monoaryl carbonate units of the formula (6a)

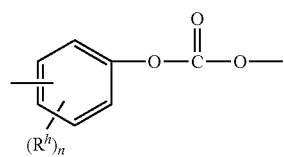

(6a)

wherein each $R^h$ is independently a halogen or $C_{1-10}$ hydrocarbon group, and n is 0 to 4. Preferably, each $R^h$ is independently a $C_{1-3}$ alkyl group, and n is 0 to 1, or n is 0. In another embodiment, no carbonate units other than units of formulas (1) and (4) are present in the copolycarbonate.

Methods for the manufacture of the copolycarbonates are known, and include, for example, processes such as interfacial polymerization and melt polymerization. All types of polycarbonate end groups are contemplated as being useful, provided that such end groups do not significantly adversely affect desired properties of the compositions. Branched polycarbonate blocks can be prepared by adding a branching agent during polymerization. Methods for the manufacture of copolycarbonates, end groups, and branching agents are described, for example, in WO 2013/175448 A1, US 2014/0295363, and WO 2014/072923.

The copolycarbonates can have an intrinsic viscosity, as determined in chloroform at 25° C., of 0.3 to 1.5 deciliters per gram (dl/gm), specifically 0.45 to 1.0 dl/gm. The copolycarbonates can have a weight average molecular weight of 10,000 to 200,000 Daltons, or 20,000 to 100,000 Daltons, 5,000 to 100,000 Daltons, or, more preferably 10,000 to 65,000 Daltons, or, 15,000 to 35,000 Daltons, each as measured by gel permeation chromatography (GPC), using a crosslinked styrene-divinylbenzene column and calibrated to bisphenol A homopolycarbonate references. GPC samples are prepared at a concentration of 1 milligram (mg) per milliliter (ml), and are eluted at a flow rate of 1.5 ml per minute. Combinations of copolycarbonates of different flow properties can be used to achieve the overall desired flow property.

The films can further comprise an additional polycarbonate that is not a high heat copolycarbonate as described above, for example in an amount of up to 35 weight percent (wt %), or 5 to 35 wt %, or 1 to 25 wt %, or 5 to 25 wt %, based on the total weight of the polymers in the composition. Such polycarbonates can be homopolymers or copolymers. In an embodiment, the additional polycarbonate is a homopolymer, in particular a bisphenol A homopolymer. In some embodiments, no polymer other than the cyclic olefin copolymer and the copolycarbonate is present. The additional polycarbonates can have an intrinsic viscosity, as determined in chloroform at 25° C., of 0.3 to 1.5 dl/gm, preferably 0.45 to 1.0 dl/gm. The polycarbonates can have weight average molecular weight (Mw) of 10,000 to 200,000 Daltons, preferably 20,000 to 100,000 Daltons, as determined by GPC as described above. Combinations of polycarbonates of different flow properties can be used to achieve the overall desired flow property.

The copolycarbonate and optional additional polycarbonate is used in combination with a cyclic olefin copolymer ("COC"). A cyclic olefin copolymer can be produced by chain polymerization of cyclic monomers, such as 8,9,10-trinorborn-2-ene (norbornene) or 1,2,3,4,4a,5,8,8a-octahydro-1,4:5,8-dimethanonaphthalene (tetracyclododecene) with ethene, or by ring-opening metathesis polymerization of various cyclic monomers followed by hydrogenation, for example. These later materials using a single type of monomer can also be called cyclic olefin polymers, and are included in this description when a cyclic olefin copolymer is described. The cyclic olefin copolymer can be a copolymer of a cyclic olefin monomer and an acyclic olefin monomer.

As used herein, a cyclic olefin monomer contains an endocyclic double bond (wherein both carbon atoms of the double bond are within the ring) or an exocyclic double bond (wherein one carbon bond is within the ring and one is not). Examples of cyclic olefin monomers include norbornene and derivatives thereof, such as 2-norbornene, 5-methyl-2-norbornene, 5,5-dimethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, and 5-phenyl-2-norbornene; and cyclopentadiene and derivatives thereof such as dicyclopentadiene and 2,3-dihydrocyclopentadiene. Other cyclic olefin monomers are described in U.S. Pat. No. 5,087,677. A combination comprising one or more of the cyclic olefin monomers can be used.

As used herein, an acyclic olefin monomer contains a double bond wholly outside of any ring present in the monomer. Examples of acyclic olefin monomers include alkenes having 1 to 20 carbon atoms, preferably 1 to 12 carbon atoms, most preferably 1 to 6 carbon atoms. Alpha-olefins are preferred, for example ethylene, 1-propene, and 1-butene. Other acyclic olefin monomers included 4-methyl-1-pentene, 1-hexene, 1-octene, 1-decene, 1-dodecene, 1-tetradecene, 1-hexadecene, 1-octadecene and 1-eicocene, 1,4-hexadiene, 4-methyl-1,4-hexadiene, 5-methyl-1,4-hexadiene, 1,7-octadiene, 5-ethylidene-2-norbornene, and 5-vinyl-2-norbornene. Preferably the acyclic olefin monomer is ethylene.

The cyclic olefin copolymers can have at least 15 mole % of units derived from the cyclic olefin monomer, or 15 to 90 mole %, or 15 to 40 mole % of units derived from the unsaturated cyclic monomers, based on total moles in the polymer. COCs are generally, or even completely, amorphous and transparent. The COC can have a glass transition temperature (Tg) of 60 to 180° C., or 60 to 150° C., or 70 to 100° C., or 100 to 180° C. The cyclic olefin copolymer can have a heat deflection temperature of 120 to 175° C., measured as per ISO 75, parts 1 and 2 at 0.45 megaPascals.

In a preferred embodiment, the cyclic olefin copolymer is a copolymer of a cyclic olefin monomer and ethylene. In another embodiment, the cyclic olefin copolymer is a copolymer of norbornene and ethylene of formula (7)

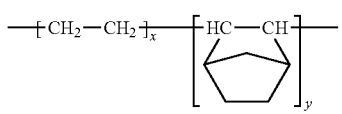
(7)

wherein x and y are the relative mole ratio of the units.

COCs can be obtained by either chain polymerization of an unsaturated cyclic monomer with an acyclic linear monomer such as ethylene, as is known in the art. For example, the cycloolefin copolymers can be prepared with the aid of transition-metal catalysts. Preparation processes are described, for example, in DD-A-109 225, EP-A-0 407 870, EP-A-0 485 893, U.S. Pat. Nos. 5,869,586, 6,068,936, and WO98/27126. Molecular weight regulation during the preparation can advantageously be effected using hydrogen. Suitable molecular weights can also be established through targeted selection of the catalyst and reaction conditions. Details in this respect are given in the above mentioned specifications. Suitable cycloolefin copolymers are the products sold under the trademark TOPAS from Topas Advanced Polymers.

The relative amount of each of the copolycarbonate, the optional additional polycarbonate, and the cyclic olefin copolymer in the films, and thus in the compositions used to form the films, can be varied to obtain the desired properties of the film. In some embodiments the films and film-forming compositions comprise 65 to 99 wt % of the copolycarbonate, 0 to 34 wt % of the additional polycarbonate, and 1 to 30 wt % of the cyclic olefin copolymer, each based on the total weight of the polymers in the films or film-forming compositions. In preferred embodiments, the films comprise 75 to 95 wt % of the copolycarbonate, 0 to 15 wt % of the additional polycarbonate, and 5 to 25 wt % of the cyclic olefin copolymer, each based on the total weight of the polymers in the film, and wherein the total of all components equals 100 wt %.

Good electrical properties are obtained when the films and film-forming compositions contain low levels of certain metal ions. Thus, the film-forming compositions and films can contain less than 50 ppm, specifically less than 40 ppm, 30 ppm, 20 ppm, or 10 ppm by weight of each of aluminum, calcium, chromium, magnesium, iron, nickel, potassium, manganese, molybdenum, sodium, titanium, and zinc. In an embodiment, the total amount of aluminum, calcium, chromium, magnesium, iron, nickel, potassium, manganese, molybdenum, sodium, titanium, and zinc in the film-forming compositions and films is less than 10 ppm.

In addition to the polycarbonate, the films and film-forming compositions can include various additives ordinarily incorporated into capacitor films, with the proviso that the additive(s) are selected so as to not significantly adversely affect the desired properties of the composition, in particular dielectric breakdown strength. For this reason, ionic additives are preferably not used. Possible additives include an impact modifier, flow modifier, antioxidant, heat stabilizer, light stabilizer, plasticizer, lubricant, release agent, anti-fog agent, antimicrobial agent, radiation stabilizer, non-ionic flame retardant, anti-drip agent, or a combination comprising one or more of the foregoing. A combination of additives can be used, for example a combination of a stabilizer, and a slip agent. In general, the additives are used in the amounts generally known to be effective. For example, the total amount of the additives can be 0.01 to 5 wt %, based on the total weight of the copolycarbonate, optional addition polycarbonate, and cyclic olefin copolymer.

Examples of impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like. If present, the impact modifier can be used in an amount of 0 to 5 wt %, based on the total weight of the copolycarbonate, optional addition polycarbonate, and cyclic olefin copolymer.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)

propionate; amides of beta-(3,5-di-tert-butyl-4-hydroxyphenyl)-propionic acid, or combinations comprising at least one of the foregoing antioxidants. Antioxidants are used in amounts of 0.01 to 0.2 parts by weight, based on 100 parts by weight of the total composition.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphite available as IRGAPHOS 168. Heat stabilizers are generally used in amounts of 0.01 to 5 wt %, based on the total weight of polymers in the composition.

Plasticizers, lubricants, or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.01 to 5 wt %, based on the total weight of polymers in the composition.

The film-forming compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the components (and any other additives) prior to melting. The melt processing is often done at 240° C. to 360° C. to avoid excessive polymer degradation while still allowing sufficient melting to get an intimate polymer mixture free of any unbelted components. The polymer blend can also be melt filtered using candle or screen filters to remove undesirable black specks or other heterogeneous contaminants.

The composition can be extruded using extruders conventionally used for thermoplastic compositions using a flat die. The extrusion cast film method involves the melting of the polymer in an extruder, conveying of the molten polymer through a flat die of small lip gap separation, the stretching of the film at relatively high take-up speeds, and the cooling/solidification of the polymer to form the final film. The extruder can be of the single- or twin-screw design, and a melt pump can also be used to provide a constant, non-pulsating flow of polymer through the die. The die lip gap can be as small as 100 to 200 micrometer, and the take-up rollers can operate at speeds of up to 200 meters (m)/minute (min). The design can also include the addition of a heated roll to temper/anneal the film and thus minimize the occurrence of frozen-in internal stresses. The edges of the film can be trimmed, and the film wound up on a roll using a tension-controlled winding mechanism. The accuracy of delivering a constant and uniform flow of molten polymer through the die, the rheological properties of the polymer used to make the film, the cleanliness of both polymer and equipment, and the mechanical characteristics of the take-up mechanism will all contribute to the successful preparation of these extruded films having relatively small thicknesses.

In an embodiment, the extrusion cast film method is one-step, scalable to larger size equipment, and does not require the use of any solvent. Even for the case of polymers of high molecular weight or high glass transition temperature; this extrusion process can be designed to provide an environment for the polymer that does not lead to excessive temperatures that can cause the thermal or mechanical degradation of the material. The use of a filtration device for the melt produces a film that is virtually free of contaminants, such as gels and black specks, which would damage the dielectric performance of these films if not properly removed from the melt. The films produced by this method are thin (10 micrometer in thickness, and even thinner), of uniform thickness across the web, flat with almost no wrinkles or surface waviness, and relatively free of contamination.

The melted composition can be conveyed through the extruder die using a melt pump. In an embodiment, the film is extruded at temperatures from 250° C. to 500° C., for example 300° C. to 450° C., and the extruded film is uniaxially stretched to produce the dielectric substrate film. In an embodiment, the components of the film-forming composition are combined, melted, and intimately mixed, then filtered to remove particles greater than 1 micrometer; extruded through a flat die at the foregoing temperatures; and then uniaxially stretched. After stretching, the film can be directly metallized as described below, or wound on a take-up roll for storage or shipping. The film can have a length of at least 10, or 100 to 10,000 meter, and a width of at least 300, or 300 to 3,000 millimeter. The rate at which the film can be extruded can vary. In commercial embodiments, the rate at which the film can be extruded varies from 10 pounds (lb)/hour (hr) (4.5 kilograms (kg)/hr) to 1000 lb/hr (450 kg/hr). The rate at which the film can be pulled from the die plate of the extruder (the take-up speed) can range from 10 meter/minute to 300 meter/minute.

The polymer films can be used in any amorphous film application, but are particularly suitable for metallization. The films can be metallized on at least one side thereof. A variety of metals and metal alloys can be used depending on the intended use of the film, for example copper, aluminum, silver, gold, nickel, zinc, titanium, chromium, vanadium, platinum, tantalum, niobium, brass, or a combination comprising at least one of the foregoing. The films are metallized on at least one side, that is, the side having an average surface roughness (Ra) of less than +1-3% of the average film thickness as determined by optical profilometry. Methods for the metallization of polymer films are known, and include, for example, vacuum metal vapor deposition, metal sputtering, plasma treatments, electron beam treatments, chemical oxidation or reduction reactions, as well as electroless wet-chemical deposition. The films can be metallized on both sides by conventional electroless plating. In another embodiment, a patterned metal layer can be formed on a surface of the film, for example by ink jet printing. The thickness of the metallized layer is determined by the intended use of the metallized film, and can be, for example, 1 Angstroms to 1000 nanometers, 500 nanometer, or 10 nanometer. In an embodiment, the thickness of the metal film can be 1 to 3000 Angstroms, 1 to 2000 Angstroms, or 1 to 1000 Angstroms. If a conductive metal is used, the resistivity of the metal layer on the polymer film can vary from 0.1 to 1000 Ohm per square or 0.1 to 100 Ohm per square measured according to ASTMD257. The unmetallized film can also have a surface resistivity greater than 0.1 Ohm per square to 100 Ohm per square measured according to ASTMD257.

The films and metallized films thus produced have a variety of advantageous physical properties.

In an embodiment, the dielectric breakdown strength of the un-metallized films is greater than 700 Volt/micrometer, preferably 700 to 1250 Volt/micrometer, preferably 780 to 1000 Volt/micrometer, preferably 750 to 900 Volt/micrometer, at 150° C. In an embodiment, the dielectric breakdown strength of the film is from 15 to 50 percent greater at 150° C. than the same film not containing a cyclic olefin copolymer.

The un-metallized films can have a high dielectric constant, in particular greater than 2.7, preferably from 2.7 to 3.4, at 1 kilohertz (kHz), 20° C. and 50% relative humidity.

The un-metallized films can have a dissipation factor, in particular 1% or less, at 1 kHz, 20° C. and 50% relative humidity.

The flatness of the un-metallized films can be determined by measuring the variation in thickness of the film over a specific area. In an embodiment, the un-metallized films can have variation of the thickness of the film of plus or minus (+/−) 10% or less, alternatively +/−9% or less, +/−8% or less, +/−6% or less, or +/−5%, +/−4%, +/−3%, +/−2%, +/−1% or less, based on the average thickness of the film over the measured area. In an embodiment, the variation in thickness can be as low as +/−1%.

The smoothness of a surface of the un-metallized films can be quantitated by measuring the surface roughness average ("Ra") of the surface by optical profilometery. In an embodiment, the un-metallized films can have a surface having a Ra of less than +/−3%, less than/−2%, or a low as +/−1% of the average thickness of the film as measured by optical profilometery.

The films and the metallized films can be essentially solvent-free, that is, contain less than 1,000 parts per million (ppm), less than 750 ppm, less than 500 ppm, or less than 250 ppm of a compound having a molecular weight of less than 250 Daltons.

The films and the metallized films can have less than 50 ppm, less than 25 ppm, or less than 10 ppm each of aluminum, calcium, chromium, magnesium, iron, nickel, potassium, manganese, molybdenum, sodium, titanium, and zinc in the polycarbonate layer.

The metallized films can be used in any metallized film application, but are particularly suitable for electrical applications, for example as capacitors or circuit materials. High energy density, high voltage non-polar capacitors can be made using a metalized polymer film that is wound into a cylindrical shape. In a specific embodiment, the polymer film is extruded, then metallized by spraying a conductive metal such as copper or aluminum onto the moving polymer film via vapor deposition in a vacuum chamber, to a thickness from 1 Angstroms to 1000 nanometers, 1 to 3000 Angstroms, or 1 to 1000 Angstroms. The resistivity of the metal on the polymer film can be in a range from about 0.1 Ohm per square to 100 Ohm per square as determined according to ASTMD257. Before the metallization process is performed, the polymer film can be appropriately masked to provide unmetallized margins at the edges of the width of the film, so that alternate layers of metallized film (when the capacitor is assembled) have unmetallized regions at opposite edges to prevent electrical shorting of the electrodes of the capacitor when the end metallization is ultimately applied.

The capacitors can then be fabricated by rolling two stacked metalized polymer films into a tubular shape. Electrical wires are connected to each metal layer. In a specific embodiment, two separate rolls of the metallized film are placed in a capacitor winder and wound tightly together on a mandrel (which can subsequently be removed) so that the layers are arranged in the sequence polymer composition/metallized layer/polymer composition/metallized layer, to replicate a typical construction of a capacitor, i.e., a dielectric with two metallic layers on opposite sides. The two rolls of film are wound with the unmetallized margins on opposite sides.

The extent of winding of the capacitor depends on the physical size of the capacitor desired or on the capacitance desired. Tight winding of the two rolls aids in removing any entrapped air that might otherwise cause premature breakdown. Individual capacitors can be processed in a clean room environment of at least class 100, incorporating HEPA filters, to reduce the likelihood of contamination of the contact point between the dielectric film layers by foreign particles, as well as reducing moisture intake in the dielectric. Electric winding can be used to better maintain uniform tension on each capacitor. The capacitor can then be taped at the edges thereof and strapped in a tray open on both sides, to prevent unwinding of the film layers and to allow the edges or ends of the cylinder to be sprayed with a conductive element, for example with a high zinc content solder followed by a regular softer end spray solder of 90% tin, 10% zinc. The first spray scratches the metallized surface and creates a trough to achieve better contact with the metallization on the dielectric film. The combination of end sprays further aids better contact adhesion with the final termination. Subsequently, conductive, e.g., aluminum leads can then be soldered onto each end to form the final termination. One termination can be spot welded to the bottom of the can, while the other termination can be parallel welded to the lid. The capacitor can be filled with a liquid impregnate (for example, isopropyl phenyl sulfone), in vacuum filling apparatus, and closed.

Other capacitor configurations are possible. For example, the capacitor can have a flat configuration comprising at least a first and a second electrode disposed in a stacked configuration; and the polymer film disposed between and in at least partial contact with each of the first and second electrodes. Additional polymer films and electrode layers can be present in alternating layers. Thus, a multilayer article for forming an electronic device is within the scope of the present claims, comprising a polymer composition/metal layer/dielectric layer, wherein the dielectric layer can be a polymer composition film as describe herein, or other dielectric material. Additional layers (e.g., additional alternating dielectric/metal layers) can optionally be present.

The capacitor films described here are useful for the construction of inverter/converter units that allow electric vehicles (including bicycles, mopeds, motorcycles, and automobiles, for example) to both recharge batteries through regenerative braking and to provide battery power to the drive units. Inverters are part of the circuits that convert low voltage (<250V) DC power from the battery into the higher voltage (>600V) AC power needed to efficiently operate the drive motors. These capacitors need to be able to operate in a high temperature environment due to both external heating from the engine compartment and internal heating due to circuit resistance. The films described herein can withstand the high temperatures (e.g., 140-150° C.) used in a vehicle application.

This disclosure is further illustrated by the following examples, which are non-limiting.

EXAMPLES

The following materials were used. Unless specifically indicated otherwise, the amount of each component is in weight percent in the following examples, based on the total weight of the composition.

TABLE 1

| Component | Description | Source |
|---|---|---|
| Co-PC1 | Copolycarbonate comprising 32 mole % PPPBP carbonate units, 68 mole % bisphenol A carbonate units, Mw = 23,000 to 28,000 g/mol (determined via GPC using bisphenol A homopolycarbonate standards) | SABIC |
| PC2 | BPA homopolycarbonate, Mw is about 30000 g/mol (determined via GPC using bisphenol A homopolycarbonate standards) | SABIC |
| Co-PC3 | Copolycarbonate comprising 43 mole % bisphenol A carbonate units and 57 mole % trimethylcyclohexylidene bisphenol carbonate units, Mw is about 29,000 g/mol (determined via GPC using bisphenol A homopolycarbonate standards) (APEC 2097) | COVESTRO |
| COC | Cyclic olefin copolymer comprising ~50 mole % ethylene units, ~50 mole % norbornene units (TOPAS 6017S-04) | TOPAS |
| PETS | Pentaerythritol tetrastearate (slip agent) | |
| Phosphite | Tris(2,4-di-tert-butylphenyl)phosphite (stabilizer) | |
| ODP | Octadecyl-3-(3,5-di-tert-butyl-4-hydroxyphenyl)-propionate (stabilizer) | |

All compositions except where indicated were compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. Compositions were compounded at a temperature of 285 to 330° C., though it will be recognized that the method is not limited to these temperatures. Films were extruded using a 25 millimeter (mm) single screw extruder utilizing a melt pump to eliminate pulsating melt flow. Melt pump was adjusted to provide optimum melt pressure in the die at temperatures between 290-330° C. The melt was extruded through a vertical 450 mm wide t-die with a die gap clearance between 100-300 micrometers. The melt curtain was cast onto a polished chill roll and drawn down in the machine direction to 3-15 micrometers thickness. Gauge was controlled by matching the melt pump output and take-up speed of the downstream equipment to provide uniform constant film thickness.

Physical measurements were made using the tests and test methods described below. Unless indicated otherwise, all tests are the tests in effect in the year 2013.

TABLE 2

| Property | Units | Test | Description (Conditions) | Specimen |
|---|---|---|---|---|
| BDS | V/μm | ASTM D149-09 Standard Test Method for Dielectric Breakdown Voltage and Dielectric Strength of Solid Electrical Insulating Materials at Commercial Power Frequencies | Dielectric breakdown strength (room temperature (20° C.) and 150° C.) | about 10 to 25 micrometer (μm) film |
| Dielectric constant (Dk) and Dissipation Factor (Df) | | ASTM D150-11 Standard Test Methods for AC Loss Characteristics and Permittivity (Dielectric Constant) of Solid Electrical Insulation | Dielectric constant (Dk) and Dissipation factor (Df) (20° C. and 150° C. at 1000 Hertz (Hz)) | about 10 to 25 μm film |
| TGA Char Yield | Weight percent | Thermogravimetric analysis | Heating to 800° C. at 20° C./min under nitrogen atmosphere. The char yield is calculated as char yield = 100% * (sample weight after heating)/(initial sample weight). | |

Compositions were prepared using the formulations shown in Table 3. Compositions were pelletized, formed into thin films, and tested for dielectric breakdown strength (BDS), dielectric constant (Dk), and dissipation factor (Df) at room temperature (20° C.) and 150° C. as shown in Table 4. Polymer compositions were varied to accommodate increasing amounts of COC. Polymer components are listed on a weight % basis to total 100%. Additives (PETS, phosphite, and ODP) were formulated in terms of parts of additives per hundred parts of polymer.

TABLE 3

| | Component weight % | | | | | |
|---|---|---|---|---|---|---|
| Example | Co-PC1 | PC2 | COC | PETS | Phosphite | ODP |
| Ex. 1* | 70 | 30 | 0 | 0.3 | 0.06 | 0 |
| Ex. 2* | 70 | 30 | 0 | 0.3 | 0.06 | 0 |
| Ex. 3 | 70 | 24 | 6 | 0.3 | 0.06 | 0.05 |
| Ex. 4 | 70 | 20 | 10 | 0.3 | 0.06 | 0.05 |
| Ex. 5 | 70 | 15 | 15 | 0.3 | 0.06 | 0.05 |
| Ex. 6* | | 100 | | | | |

*Comparative

TABLE 4

| | BDS | | Dielectric constant at 1000 Hz | | Dissipation Factor at 1000 Hz | |
|---|---|---|---|---|---|---|
| Example | 20° C. | 150° C. | 20° C. | 150° C. | 20° C. | 150° C. |
| Ex. 1* | 826 | 551 | 3.13 | 3.12 | 0.002 | 0.001 |
| Ex. 2* | 779 | 633 | | | | |
| Ex. 3 | 787 | 703 | 3.17 | 3.16 | 0.002 | 0.001 |
| Ex. 4 | 849 | 789 | 3.16 | 3.12 | 0.002 | 0.001 |

TABLE 4-continued

| Example | BDS | | Dielectric constant at 1000 Hz | | Dissipation Factor at 1000 Hz | |
|---|---|---|---|---|---|---|
| | 20° C. | 150° C. | 20° C. | 150° C. | 20° C. | 150° C. |
| Ex. 5 | 841 | 877 | 3.13 | 3.09 | 0.002 | 0.001 |
| Ex. 6* | 667 | 566 | 2.5 | 2.46 | <0.001 | <0.001 |

*Comparative

The data show that the BDS strength at 150° C. is much lower than the room temperature (20° C.) BDS in samples with no COC added (Exs. 1-2). Moreover, the data shows that the 150° C. BDS is much lower than the room temp (20° C.) BDS in an entirely COC sample (Ex. 6). Surprisingly, the data shows a synergistic benefit to copolycarbonate/COC blends, in that compositions including COC gave a much higher 150° C. BDS. Blends with 6 to 10 wt % COC gave 150° C. BDS from 703 to 789 V/μm, while a blend with 15 wt % COC levels gave a 150° C. BDS of 877 V/μm (an increase of over 200 V/μm over non-COC containing materials). Added COC had a very small effect on room temp (20° C.) BDS, dielectric constant, or dissipation factor.

Compositions were also prepared from Co-PC3 and COC, as shown in Table 5. The polymers used in the compositions listed in Table 5 contained stabilizers and other additives.

TABLE 5

| | Component weight % | |
|---|---|---|
| Example | Co-PC3 | COC |
| Ex. 7* | 100 | |
| Ex. 8 | 90 | 10 |
| Ex. 6* | | 100 |

*Comparative

The compositions listed in Table 5 were tested as described above. Results are provided in Table 6.

TABLE 6

| Example | BDS | | Dielectric constant at 1000 Hz | | Dissipation Factor at 1000 Hz | |
|---|---|---|---|---|---|---|
| | 20° C. | 150° C. | 20° C. | 150° C. | 20° C. | 150° C. |
| Ex. 7* | 879 | 598 | 2.79 | 2.77 | 0.002 | 0.001 |
| Ex. 8 | 889 | 713 | 2.75 | 2.73 | 0.001 | 0.001 |
| Ex. 6* | 667 | 566 | 2.5 | 2.46 | <0.001 | <0.001 |

*Comparative

The results show that the BDS at 150° C. increases significantly (from 598 V/μm to 713 V/μm) when 10 wt % COC is added to PC3, while the room temperature BDS, dielectric constant, and dissipation factor are largely unaffected (see Ex. 7 vs. Ex. 8).

DSC and TGA char yield tests were conducted on several compositions. The results are provided in Table 7.

TABLE 7

| Example | DSC (Tg) | TGA char yield |
|---|---|---|
| Ex. 1* | 185° C. | 24.3 |
| Ex. 2* | 179° C. | 25.9 |
| Ex. 3 | 183° C. | 25.6 |
| Ex. 4 | 182° C. | 23.9 |
| Ex. 5 | 187° C. | 22.5 |
| Ex. 6* | 177° C. | 0 |

TABLE 7-continued

| Example | DSC (Tg) | TGA char yield |
|---|---|---|
| Ex. 7* | 204° C. | 14.8 |
| Ex. 8 | 202° C. | 11.9 |

DSC is used to measure the Tg (glass transition temperature) of the polymer samples. DSC is a standard technique used to measure Tg. Some of the samples are phase separated blends and each of these phases will possess its own Tg. In the samples tested the two phases have similar Tgs and only one Tg was observed in the DSC. TGA was used to measure the char yield of the polymer samples.

This disclosure further encompasses the following embodiments.

Embodiment 1

A film, comprising 70 to 99 weight percent, preferably 75 to 95 weight percent, of an amorphous, high heat copolycarbonate having a glass transition temperature of at least 170° C., preferably 170 to 230° C., more preferably 175 to 200° C., and 1 to 30 weight percent, preferably 5 to 25 weight percent of a cyclic olefin copolymer each based on the total weight of polymers in the film; wherein the film has a dielectric breakdown strength of greater than 700 Volts/micrometer, preferably 700 to 1250 Volts/micrometer at 150° C.

Embodiment 2

The film of Embodiment 1, wherein the film has a dielectric breakdown strength of 780 to 1000 V/μm at room temperature.

Embodiment 3

The film of Embodiment 1, wherein the film has a char yield of less than 30 weight percent, as determined using thermogravinetric analysis under nitrogen.

Embodiment 4

The film of any one or more of Embodiments 1 to 3, wherein the film has one or more of a glass transition temperature of 170-225° C., an average thickness of 1 to 25 micrometers, preferably an average thickness of 3 to 5 micrometers, preferably with a standard deviation of 0.01 micrometer or less, a dielectric constant at 1 kHz, 20° C., and 50% relative humidity of at least 2.7, a dissipation factor at 1 kHz, 20° C., and 50% relative humidity of 1% or less, or an energy density of at least 7 J/cc.

Embodiment 5

The film of any one or more of Embodiments 1 to 4, wherein the film has a dielectric breakdown strength from 15 to 50 percent greater at 150° C. than the same film not containing a cyclic olefin copolymer.

Embodiment 6

The film of any one or more of Embodiments 1 to 5, wherein the copolycarbonate comprises first carbonate units of formula (1)

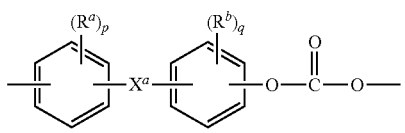

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-5}$ alkyl, or a group of the formula —C(=$R^e$)— wherein $R^e$ is a divalent $C_{1-6}$ hydrocarbon group; and second carbonate units of formula (4)

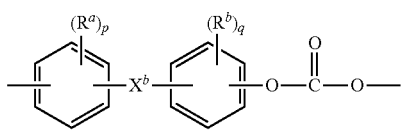

wherein $R^a$ and $R^b$ are each independently $C_{1-12}$ alkenyl, $C_{3-s}$ cycloalkyl, or $C_{1-12}$ alkoxy, p and q are each independently integers of 0 to 4, and $X^b$ is a $C_{3-8}$ cycloalkylene, a fused $C_{6-18}$ cycloalkylene, a group of the formula -$J^1$-G-$J^2$- wherein $J^1$ and $J^2$ are the same or different $C_{1-6}$ alkylene group and G is a $C_{3-12}$ cycloalkylene, a $C_{3-12}$ cycloalkylidene, or a $C_{6-16}$ arylene, a $C_{12-25}$ alkylidene of formula —C($R^c$)($R^d$)— wherein $R^c$ and $R^d$ are each independently hydrogen, $C_{1-24}$ alkyl, $C_{4-12}$ cycloalkyl, $C_{6-12}$ aryl, $C_{7-12}$ arylalkylene, $C_{7-12}$ heteroarylalkylene, $C_{7-12}$ alkylarylene, $C_{1-12}$ heteroalkyl, $C_{3-12}$ heterocycloalkyl, or $C_{7-12}$ heteroaryl, a group of the formula —C(=$R^e$)— wherein $R^e$ is a divalent $C_{7-31}$ hydrocarbon group, a $C_{3-18}$ cycloalkylidene, a fused $C_{7-18}$ cycloalkylidene, or a fused $C_{6-18}$ heterocycloalkylidene.

Embodiment 7

The film of Embodiment 6, wherein the first carbonate units are bisphenol A units, and in the second carbonate units $X^b$ is a $C_{3-18}$ cycloalkylidene, a fused $C_{7-18}$ cycloalkylidene, or a fused $C_{6-18}$ heterocycloalkylidene.

Embodiment 8

The film of Embodiment 7, wherein $X^b$ is a $C_{3-18}$ cycloalkylidene, a fused $C_{7-18}$ cycloalkylidene or a fused $C_{6-18}$ heterocycloalkylidene of the formula

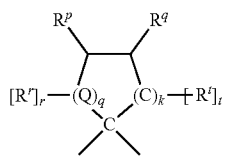

wherein $R^r$, $R^p$, $R^q$, and $R^t$ are each independently hydrogen, oxygen, or $C_{1-12}$ organic groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl or $C_{1-12}$ acyl; r is 0 to 2, t is 1 or 2, q is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring.

Embodiment 9

The film of any one or more of Embodiments 1 to 8, wherein the first carbonate unites are derived from bisphenol A, and the second carbonate units are derived from 1-bis(4-hydroxyphenyl)cyclododecylidene, 1,1-bis(4-hydroxyphenyl)adamantylidene, 2-phenyl-3,3-bis(4-hydroxyphenyl) phthalimidine, 1,1-bis(4-hydroxy-3-methylphenyl) cyclohexane, 1,1-bis(4-hydroxyphenyl)-3,3,5-trimethylcyclohexane, or a combination comprising at least one of the foregoing.

Embodiment 10

The film of Embodiment 9, wherein the second carbonate units are derived from 2-phenyl-3,3-bis(4-hydroxyphenyl) phthalimidine.

Embodiment 11

The film of Embodiment 9, wherein the second carbonate units are derived from 1,1-bis(4-hydroxyphenyl)-3,3,5-trimethylcyclohexane.

Embodiment 12

The film of any one or more of Embodiments 1 to 12, further comprising a polycarbonate homopolymer.

Embodiment 13

The film of any one or more of Embodiments 1 to 13, wherein the cyclic olefin copolymer is a copolymer of a cyclic olefin monomer and an acyclic olefin monomer, preferably a copolymer of a cyclic olefin monomer and ethylene, more preferably a copolymer of norbornene and ethylene.

Embodiment 14

The film of any one or more of Embodiments 1 to 13, wherein the cyclic olefin copolymer has at least one of a heat deflection temperature of 120 to 175° C., measured as per ISO 75, parts 1 and 2 at 0.45 megaPascal; or a glass transition temperature of 100 to 176° C.

Embodiment 15

The film of any one or more of Embodiments 1 to 14, further comprising an impact modifier, flow modifier, antioxidant, heat stabilizer, light stabilizer, plasticizer, lubricant, release agent, anti-fog agent, antimicrobial agent, radiation stabilizer, non-ionic flame retardant, anti-drip agent, or a combination comprising one or more of the foregoing.

Embodiment 16

The film of any one or more of Embodiments 1 to 15, comprising 5 to 25 wt % of a copolymer comprising units derived from norbornene and ethylene; 75 to 95 wt % of a copolycarbonate comprising bisphenol A carbonate units and 2-phenyl-3,3'-bis(4-hydroxyphenyl) phthalimidine carbonate units or a copolycarbonate comprising bisphenol A carbonate units and bisphenol 1,1-bis(4-hydroxyphenyl)-3,3,5-trimethylcyclohexane units.

Embodiment 17

A method of producing a film of any one or more of Embodiments 1 to 16, comprising extruding a film-forming composition comprising the copolycarbonate comprising first repeating bisphenol carbonate units and second repeating carbonate units that are not the same as the first repeating units; and the cyclic olefin copolymer.

Embodiment 18

An article comprising the film of any one or more of Embodiments 1 to 16 or produced by the method of Embodiment 17.

Embodiment 19

The article of Embodiment 18, further comprising a layer of a conductive metal or metal alloy deposited on at least a portion of the film, wherein the conductive metal or metal alloy comprises aluminum, zinc, copper, silver, gold, nickel, titanium, chromium, vanadium, platinum, tantalum, niobium, brass, or a combination comprising at least one of the foregoing.

Embodiment 20

The article of Embodiment 19, wherein the conductive metal layer has a thickness of 1 to 3,000 Angstroms, or 1 to 2,000 Angstroms.

Embodiment 21

A capacitor comprising the article of any one or more of Embodiments 18 to 20, preferably a wound, metallized film of Embodiment 16.

Embodiment 22

An electronic device comprising the capacitor of Embodiment 21.

Embodiment 23

The electronic device of Embodiment 22 which is used in an inverter, preferably in a vehicle.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. The modifier "about" used in connection with a quantity is inclusive of the stated value (e.g., "about 25-50 wt %" is a disclosure of "25-50 wt %") and has the meaning dictated by the context (e.g., includes the degree of error associated with measurement of the particular quantity). The notation "±10%" means that the indicated measurement can be from an amount that is minus 10% to an amount that is plus 10% of the stated value.

The terms "first," "second," and the like, "primary," "secondary," and the like, as used herein do not denote any order, quantity, or importance, but rather are used to distinguish one element from another. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. A "combination" is inclusive of blends, mixtures, alloys, reaction products, and the like.

Unless defined otherwise, technical and scientific terms used herein have the same meaning as is commonly understood by one of skill in the art to which this disclosure belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—). "Fused" as used herein means that the indicated group is fused to a $C_{3-8}$ cycloaliphatic, $C_{6-13}$ aromatic, or $C_{2-12}$ heteroaromatic group.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents are permissible provided that the substitutions do not significantly adversely affect synthesis or use of the compound. Exemplary groups that can be present on a "substituted" position include, but are not limited to, cyano; hydroxyl; nitro; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_1$-6 or $C_{1-3}$ alkoxys; $C_{6-10}$ aryloxy such as phenoxy; $C_{1-6}$ alkylthio; $C_{1-6}$ or $C_{1-3}$ alkylsulfinyl; $_{C1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and 6 to 18 ring carbon atoms; or arylalkoxy having 1 to 3 separate or fused rings and 6 to 18 ring carbon atoms, with benzyloxy being an exemplary arylalkoxy. The number of carbon atoms indicated for a given group includes any substituents.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:
1. A film, comprising
   70 to 99 weight percent of an amorphous, high heat copolycarbonate having a glass transition temperature of at least 170° C., and
   1 to 30 weight percent of a cyclic olefin copolymer each based on the total weight of polymers in the film;
   wherein the film has
   a dielectric breakdown strength of greater than 700 Volts/micrometer at 150° C.

2. The film of claim 1, wherein the film has a char yield of less than 30 weight percent, as determined using thermogravimetric analysis under nitrogen.

3. The film of claim 1, wherein the film has one or more of
   a glass transition temperature of 170-225° C.,
   an average thickness of 1 to 25 micrometers,
   a dielectric constant at 1 kHz, 20° C., and 50% relative humidity of at least 2.7,
   a dissipation factor at 1 kHz, 20° C., and 50% relative humidity of 1% or less, or an energy density of at least 7 J/cc.

4. The film of claim 1, wherein the film has a dielectric breakdown strength from 15 to 50 percent greater at 150° C. than the same film not containing a cyclic olefin copolymer.

5. The film of claim 1, wherein the copolycarbonate comprises first carbonate units of formula (1)

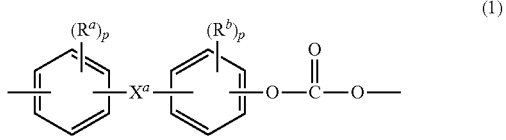

(1)

wherein
   $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and
   $X^a$ is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-5}$ alkyl, or a group of the formula —C(=$R^e$)— wherein $R^e$ is a divalent $C_{1-6}$ hydrocarbon group; and
second carbonate units of formula (4)

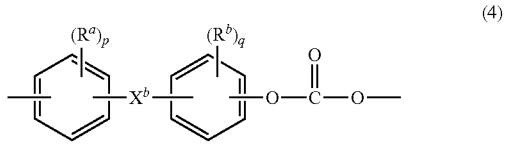

(4)

wherein
   $R^a$ and $R^b$ are each independently $C_{1-12}$ alkenyl, $C_{3-8}$ cycloalkyl, or $C_{1-12}$ alkoxy,
   p and q are each independently integers of 0 to 4, and
   $X^b$ is
      a $C_{3-8}$ cycloalkylene,
      a fused $C_{6-18}$ cycloalkylene,
      a group of the formula -$J^1$-G-$J^2$- wherein $J^1$ and $J^2$ are the same or different $C_{1-6}$ alkylene group and G is a $C_{3-12}$ cycloalkylene, a $C_{3-12}$ cycloalkylidene, or a $C_{6-16}$ arylene,
      a $C_{12-25}$ alkylidene of formula —C($R^c$)($R^d$)— wherein $R^c$ and $R^d$ are each independently hydrogen, $C_{1-24}$ alkyl, $C_{4-12}$cycloalkyl, $C_{6-12}$ aryl, $C_{7-12}$ arylalkylene, $C_{7-12}$ heteroarylalkylene, $C_{7-12}$ alkylarylene, $C_{1-12}$ heteroalkyl, $C_{3-12}$ heterocycloalkyl, or $C_{7-12}$ heteroaryl,
      a group of the formula —C(=$R^e$)— wherein $R^e$ is a divalent $C_{7-31}$ hydrocarbon group,
      a $C_{3-18}$ cycloalkylidene,
      a fused $C_{7-18}$ cycloalkylidene, or
      a fused $C_{6-18}$ heterocycloalkylidene.

6. The film of claim 5, wherein the first carbonate units are bisphenol A units, and in the second carbonate units $X^b$ is a $C_{3-18}$ cycloalkylidene, a fused $C_{7-18}$ cycloalkylidene, or a fused $C_{6-18}$ heterocycloalkylidene.

7. The film of claim 6, wherein $X^b$ is a $C_{3-18}$ cycloalkylidene, a fused $C_{7-18}$ cycloalkylidene or a fused $C_{6-18}$ heterocycloalkylidene of the formula (4a)

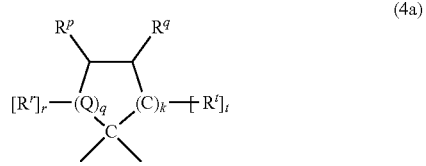

(4a)

wherein $R^r$, $R^p$, $R^q$, and $R^t$ are each independently hydrogen, oxygen, or $C_{1-12}$ organic groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-42}$ aryl or $C_{1-12}$ acyl; r is 0 to 2, t is 1 or 2, q is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring.

8. The film of claim 5, wherein
the first carbonate unites are derived from bisphenol A, and
the second carbonate units are derived from 1-bis(4-hydroxyphenyl)cyclododecylidene, 1,1-bis(4-hydroxyphenyl)adamantylidene, 2-phenyl-3,3-bis(4-hydroxyphenyl)phthalimidine, 1,1-bis(4-hydroxy-3-methylphenyl)cyclohexane, 1,1-bis(4-hydroxyphenyl)-3,3,5-trimethylcyclohexane, or a combination comprising at least one of the foregoing.

9. The film of claim 8, wherein the second carbonate units are derived from 2-phenyl-3,3-bis(4-hydroxyphenyl)phthalimidine.

10. The film of claim 8, wherein the second carbonate units are derived from 1,1-bis(4-hydroxyphenyl)-3,3,5-trimethylcyclohexane.

11. The film of claim 1 further comprising a polycarbonate homopolymer.

12. The film of claim 1, wherein the cyclic olefin copolymer is a copolymer of a cyclic olefin monomer and an acyclic olefin monomer.

13. The film of claim 1, wherein the cyclic olefin copolymer has at least one of a heat deflection temperature of 120 to 175° C., measured as per ISO 75, parts 1 and 2 at 0.45 megaPascal; or
a glass transition temperature of 100 to 176° C.

14. The film of claim 1, comprising
5 to 25 wt % of a copolymer comprising units derived from norbornene and ethylene;
75 to 95 wt % of a copolycarbonate comprising bisphenol A carbonate units and 2-phenyl-3,3'-bis(4-hydroxyphenyl) phthalimidine carbonate units or a copolycarbonate comprising bisphenol A carbonate units and bisphenol 1,1-bis(4-hydroxyphenyl)-3,3,5-trimethylcyclohexane units.

15. A method of producing a film of claim 1, comprising extruding a film-forming composition comprising
the copolycarbonate comprising first repeating bisphenol carbonate units and second repeating carbonate units that are not the same as the first repeating units; and
the cyclic olefin copolymer.

16. An article comprising the film of claim 1.

17. The article of claim 16, further comprising a layer of a conductive metal or metal alloy deposited on at least a portion of the film, wherein the conductive metal or metal alloy comprises aluminum, zinc, copper, silver, gold, nickel, titanium, chromium, vanadium, platinum, tantalum, niobium, brass, or a combination comprising at least one of the foregoing.

18. A capacitor comprising the article of claim 16.

19. An electronic device comprising the capacitor of claim 18.

20. An inverter comprising the electronic device of claim 19.

* * * * *